June 20, 1950          O. HOAG          2,511,850
VOLTAGE-REGULATED POWER SUPPLY
Filed Nov. 23, 1945
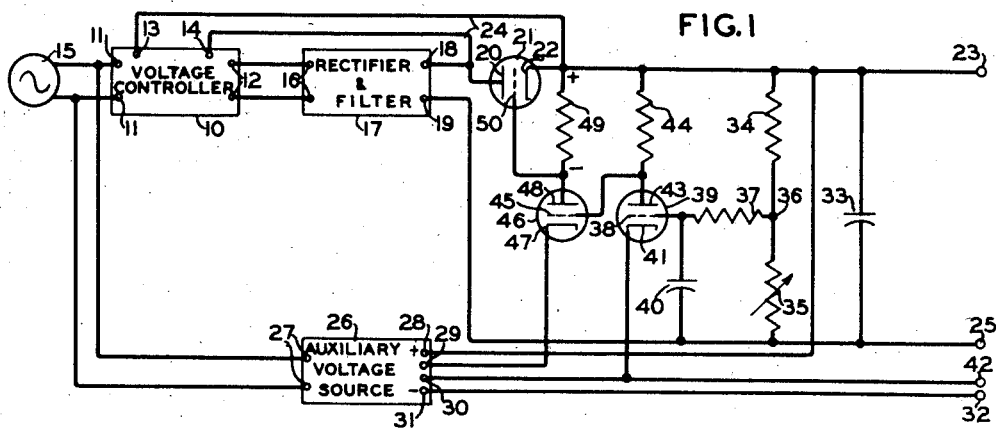
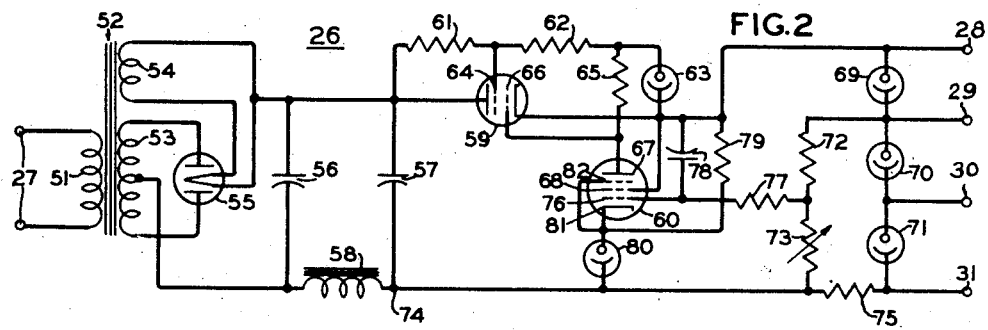
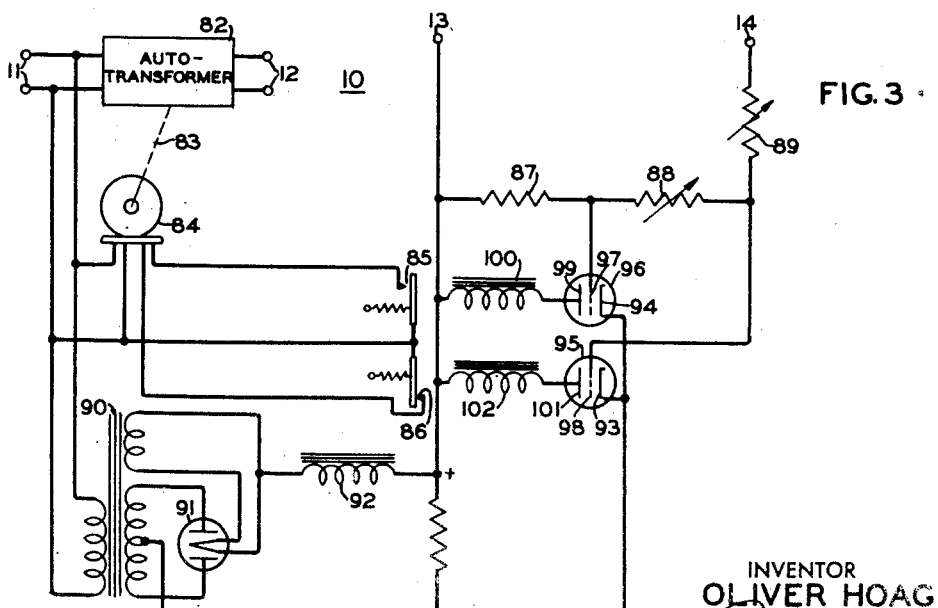
INVENTOR
OLIVER HOAG
BY Paul B. Hunter
ATTORNEY Patented June 20, 1950

2,511,850

UNITED STATES PATENT OFFICE 2,511,850

VOLTAGE-REGULATED POWER SUPPLY

Oliver Hoag, Garden City, N. Y., assignor to The Sperry Corporation, a corporation of Delaware Application November 23, 1945, Serial No. 630,396

13 Claims. (Cl. 321—23)

The present invention relates to voltage-regulated power supplies, and more particularly to such supplies utilizing electronic regulating means of the degenerative type. Power supplies of the type here contemplated are adapted for supplying, from an alternating-current source, a direct voltage which remains substantially fixed in spite of wide variations in the voltage of the source or in the current requirements of the load.

The usual voltage-regulated power supply of the prior art comprises a rectifier and filter adapted to supply a direct-current output to a load from an alternating-current source, a regulator tube connected in series with the load, a reference voltage source, and a direct-current amplifier adapted to vary the grid-bias voltage and hence the series resistance of the regulator tube in accordance with changes in the voltage across the load due to fluctuations in the alternating-current input voltage or in the current requirements of the load. In general, this conventional type of voltage-regulated power supply has several serious disadvantages. The range over which the output voltage can be adjusted is limited in part by the anode dissipation of the series regulator tube.

The extent to which output ripple can be eliminated is a function of the stability of the reference voltage source. In the conventional regulated power supply, this source usually comprises one or more gas-filled, cold-cathode voltage regulator tubes. Accordingly, the degree of ripple in the output of such a power supply is directly dependent upon the perfection of performance of these tubes. If a battery is used as the source of reference voltage, difficulties due to aging and to internal changes causing erratic voltage fluctuations are encountered.

In general, it is not feasible to reduce the regulated voltage which can be supplied below a predetermined minimum value, this value being a function both of the grid-bias voltage required to bring the series regulator tube to plate-current cutoff and of the minimum anode voltage required by the direct-current control amplifier.

In the past, an attempt has been made to overcome the first disadvantage above enumerated by providing means for changing the alternating-current input voltage in steps roughly corresponding to stepped changes in the output voltage of the regulated power supply. This adjustment is necessarily made by manually operating a ganged tap switch as the load requirements change, or when the power supply is utilized for various purposes. Only by coincidence would such an arbitrary adjustment of the alternating input voltage maintain the voltage drop across the series regulator tube within an optimum region. Furthermore, the use of a tap switch for thus varying the output voltage in large steps necessarily has to be accompanied by a second variable control if continuous adjustment of the output voltage, even over a limited range, is to be provided.

Up to now, the above-enumerated and other disadvantages of previously known regulated power supplies have seriously limited their usefulness and versatility both in general and particularly where it is desired to employ a single regulated power supply for a number of different purposes, as for example in laboratory and other experimental work. The provision of a regulated power supply free from these disadvantages is the primary aim of the present invention.

Accordingly, it is an object of the present invention to provide a voltage-regulated power supply having a single control adapted to vary the output voltage continuously over a wide range.

A further object of the invention is the provision of a voltage-regulated power supply the output of which may be reduced smoothly to zero and even carried to a negative value if desired.

Another object of the invention is to provide a regulated power supply in which the power dissipation in the series regulator tube is maintained at a low value, so that high efficiency of operation is realized over a wide range in input voltages and load conditions, and a relatively small regulator tube may be employed.

A still further object of the invention is to provide improved apparatus and instrumentalities embodying novel features and principles, adapted for use in realizing the above objects and also adapted for use in other fields.

The above and other objects of the invention are realized by providing an auxiliary regulated voltage supply which is utilized simultaneously as a source of reference voltage, as a plate supply for the direct-current control amplifier, and as a source of "bucking" or opposition voltage to provide zero or negative output voltage from the main power supply. Means are provided for varying the alternating input voltage to the rectifier unit as a function of the voltage drop across the series regulator tube. More specifically, a servo mechanism which is responsive to the voltage drop across the series regulator tube may be utilized to vary the setting or adjustment of an autotransformer or other suitable alternating-current voltage divider which is interposed between the alternating-current line and the input to the rectifier-filter portion of the power supply. Alternatively, a saturable-core reactor or transformer, or a variable capacitor, may be employed for varying the alternating input voltage to the rectifier, without departing from the scope of the present invention.

In general, an alternating voltage regulator is non-dissipative and hence has relatively high efficiency, but has the disadvantage of being comparatively slow-acting. A direct voltage regulator, on the other hand, is necessarily dissipative and therefore relatively inefficient, but has the advantage of fast action. In accordance with the present invention, these two types of regulator are used in combination in a manner which realizes the advantages of each without a handicap due to their respective disadvantages. Thus the alternating voltage regulator provides coarse and relatively slow control over a comparatively wide range with excellent efficiency, while the direct voltage regulator provides rapid, fine control over a range sufficiently limited to restrict power losses to a reasonable value.

Another feature of the present invention is the provision of a single control knob for the purpose of varying the output voltage of the regulated power supply continuously over a relatively high range of voltages.

The invention in another of its aspects relates to novel features of the instrumentalities described herein for achieving the principal objects of the invention and to novel principles employed in those instrumentalities, whether or not these features and principles are used for the principal objects or in the same field.

The above features and brief description of the invention will be better understood by reference to the following detailed description taken in connection with the accompanying drawing, in which like components are designated by like reference numerals and in which:

Fig. 1 is a circuit diagram, partly in block form, of a voltage-regulated power supply in accordance with the present invention;

Fig. 2 is a circuit diagram of an auxiliary voltage source suitable for use in the power supply of Fig. 1; and Fig. 3 shows, partly in block form, a voltage controller adapted for use in the power supply of Fig. 1.

Referring to Fig. 1 of the drawing, there is shown a voltage controller 10 having input terminals 11, output terminals 12, and control terminals 13 and 14. A source of alternating current 15 is connected to input terminals 11. Output terminals 12 are connected to input terminals 16 of rectifier and filter unit 17, having output terminals 18 and 19.

Output terminal 18 of unit 17 is connected to anode 20 of vacuum tube 21, the cathode 22 of which is connected to terminal 23. Anode 20 and cathode 22 of vacuum tube 21 are also connected respectively to control terminals 14 and 13 of voltage controller 10 by means of leads 24. Output terminal 19 of unit 17 is connected to terminal 25.

An auxiliary voltage source 26 is provided, having input terminals 27 which are connected to source 15, and having output terminals 28, 29, 30 and 31. Output terminal 28 is connected to terminal 23, and output terminal 31 is connected to terminal 32.

A capacitor 33 is connected between terminals 23 and 25. A voltage divider comprising a fixed resistor 34 in series with an adjustable resistor 35 is also connected between terminals 23 and 25. The junction 36 of resistors 34 and 35 is connected, through resistor 37, to the grid 38 of a vacuum tube 39. Grid 38 is by-passed to terminal 25 by capacitor 40.

The cathode 41 of vacuum tube 39 is connected to output terminal 30 of source 26, and also to terminal 42. The anode 43 of vacuum tube 39 is connected through load resistor 44 to terminal 23. Anode 43 is also connected to grid 45 of vacuum tube 46, cathode 47 of which is connected to output terminal 29 of source 26. Anode 48 of vacuum tube 46 is connected through load resistor 49 to terminal 23, and is also connected to grid 50 of vacuum tube 21.

In operation, the alternating potential supplied to rectifier and filter unit 17 is adjusted, in a manner to be described below, by voltage controller 10. The resultant direct potential is developed between terminals 18 and 19, terminal 18 being positive and terminal 19 being negative.

Vacuum tube 21 serves as a variable resistance in series between terminal 18 and terminal 23, to which one terminal of the load (not shown) may be connected when it is desired to secure an output potential continuously variable from one positive value to a substantially larger positive value. The other load terminal is connected to terminal 25. Assuming for the moment that the load is thus connected, a selected portion of the total voltage across the load is taken off by means of the voltage divider comprising resistor 34 and rheostat 35, and applied to grid 38 of vacuum tube 39, which serves as the first stage of a direct-coupled amplifier.

The potential developed across resistor 34 is compared, in vacuum tube 39, with the potential applied to cathode 41 by auxiliary voltage source 26. An amplified version of the difference in these voltages appears across load resistor 44 in the anode circuit of vacuum tube 39 and is applied to grid 45 of vacuum tube 46. The latter tube functions in turn further to amplify such a voltage difference, and to develop across its load resistor 49 a potential having the polarity indicated in the drawing.

The potential across resistor 49 is applied between cathode 22 and grid 50 of vacuum tube 21, and serves to control its internal resistance. A relatively small increase in this potential causes a relatively large increase in the internal resistance of tube 21. Since the potential across resistor 49 is actually an enlarged version of the potential applied to grid 38 of vacuum tube 39, which in turn depends directly upon the potential between terminals 23 and 25, it will readily be seen that a very small increase in the latter potential produces a comparatively large increase in the series resistance introduced in the circuit by vacuum tube 21. Thus changes in potential between terminals 23 and 25 are automatically substantially compensated for by the degenerative action of the voltage regulator.

In order to maintain the voltage drop across vacuum tube 21, and hence its anode power dissipation, within safe limits, the input voltage to unit 17, applied at terminals 16, is varied in accordance with the voltage drop across vacuum tube 21. This is accomplished by means of voltage controller 10, which has its control terminals 13 and 14 connected across vacuum tube 21. As will be explained in more detail below, the output voltage appearing at terminals 12 of voltage controller 10 decreases as the voltage drop across vacuum tube 21 increases, and vice versa. Thus tube 21 is relieved of the necessity of having its voltage drop vary over a wide range to compensate for fluctuations in line voltage, load current, or output voltage as determined by the setting of rheostat 35. Accordingly, this tube may be smaller and less expensive than in previous power supplies of equivalent rating.

Rheostat 35 serves as the only control necessary to vary the output voltage of the power supply over a wide range. No other adjustments are required, as in previously known systems, to prevent excessive power dissipation in the series regulator tube as the output voltage is lowered, or as the line voltage increases.

If it is desired to secure a load potential range varying from slightly more than zero to a maximum value, the load may be connected between terminals 25 and 42. With such a connection, that portion of the output of auxiliary voltage source 26 appearing between its output terminals 28 and 30 opposes the potential between terminals 23 and 25, thus permitting the load potential to be continuously reduced almost to zero by an adjustment of the single rheostat 35. With this connection, the voltage between terminals 28 and 30 is utilized substantially to overcome the minimum potential between terminals 23 and 25 when rheostat 35 is adjusted for minimum resistance.

In some applications of the present invention it may be desired to have the voltage across the load continuously variable from a maximum positive value through zero to an appreciable negative value. This is easily achieved in the arrangement of Fig. 1 by connecting the load between terminals 25 and 32. With such a connection, the entire output of auxiliary voltage source 26, developed between its output terminals 28 and 31, is connected in opposition to the voltage appearing between terminals 23 and 25. Merely by making a proper choice of the relative potentials of the main voltage source and of the auxiliary voltage source, the polarity of terminal 32 with respect to terminal 25 may be changed as rheostat 35 is continuously adjusted.

Referring now to Fig. 2 of the drawing, there is shown in detail an auxiliary voltage source 26 suitable for use in the regulated power supply of Fig. 1. Input terminals 27 are connected to the primary winding 51 of a transformer 52, having a center-tapped secondary winding 53 and a second secondary winding 54. The end terminals of winding 53 are connected to the anodes of full-wave rectifier tube 55, the filament of which is energized by winding 54. A low-pass filter comprising shunt capacitors 56 and 57 and series inductor 58 is connected between one terminal of secondary winding 54 and the center tap of secondary winding 53. The output of filter 56, 57, 58 supplies a voltage regulator comprising series vacuum tube 59 and amplifier vacuum tube 60. These vacuum tubes are arranged in a conventional manner to supply a regulated direct potential between output terminals 28 and 31.

A network comprising resistors 61 and 62 and gas-filled, cold-cathode voltage regulator tube 63 is connected between the anode and the cathode of vacuum tube 59. The junction of resistors 61 and 62 is connected to the screen grid 64 of vacuum tube 59. The junction of resistor 62 and regulator tube 63 is connected, through resistor 65, to the control grid 66 of vacuum tube 59 and to the anode 67 of vacuum tube 60. The screen grid 68 of vacuum tube 60 is connected to the cathode of vacuum tube 59.

A network comprising a series of voltage regulator tubes 69, 70 and 71 is connected between output terminals 28 and 31. The junction of regulator tubes 69 and 70 is connected to output terminal 29 and, through a voltage divider comprising resistor 72 and variable resistor 73, to the negative output terminal 74 of the filter. Output terminal 30 is connected to the junction of regulator tubes 70 and 71, and a resistor 75 is connected between output terminal 31 and negative filter terminal 74.

Control grid 76 of vacuum tube 60 is connected through resistor 77 to the junction of resistors 72 and 73. A capacitor 78 is connected between terminal 28 and control grid 76. A network comprising resistor 79 and voltage regulator tube 80 is connected between terminals 28 and 74, the junction of elements 79 and 80 being connected to cathode 81 of vacuum tube 60. The suppressor grid 82 of vacuum tube 60 is connected to its cathode 81.

In operation, the auxiliary voltage source of Fig. 2 functions to provide a plurality of regulated direct output voltages when a source of alternating current is connected to input terminals 27. These output voltages are subject to regulation both electronically by the action of vacuum tube 60 in furnishing the correct bias potential to series regulator tube 59, and by the conventional operation of the voltage regulator tubes 69, 70 and 71. Series resistor 77 and shunt capacitor 78 serve to minimize the effect of ripple or hum voltages. The connection of anode 67 of vacuum tube 60 through load resistor 65 to a tap on voltage divider 61, 62, 63 serves to provide a higher effective plate voltage for vacuum tube 60 and hence appreciably improves the sensitivity of the electronic voltage regulator to small changes in output voltage.

Fig. 3 shows one form which the voltage controller 10 of Fig. 1 may take. Input terminals 11 are connected to an autotransformer 82, the output of which is connected to output terminals 12. Autotransformer 82 may have its effective turns ratio varied mechanically by a coupling shown diagrammatically by a dotted line 83, extending between autotransformer 82 and control motor 84.

Motor 84 has its armature continuously energized from input terminals 11 and its forward and reverse field windings selectively energized from the same source, through relay contacts 85 and 86.

Control terminals 13 and 14 are shunted by a network comprising fixed resistor 87 and adjustable resistors 88 and 89 in series. Terminal 13 is connected to the positive terminal of a source of direct voltage, which is shown by way of example as comprising a transformer 90 energized from input terminals 11, a full-wave rectifier tube 91, and a filter choke coil 92. The negative terminal of this source is connected to cathodes 93 and 94 of vacuum tubes 95 and 96, respectively. Grid 97 of vacuum tube 96 is connected to the junction of resistors 87 and 88, and grid 98 of vacuum tube 95 is connected to the junction of resistors 88 and 89.

The anode 99 of vacuum tube 96 is connected through relay winding 100 associated with relay contacts 85 to the positive terminal of the potential source. Similarly, anode 101 of vacuum tube 95 is conected through relay winding 102 associated with relay contacts 86 to the same terminal.

In operation, the direction in which motor 84 revolves, and hence the direction of change of setting of autotransformer 82, depends upon whether or not relay windings 100 and 102 are energized. The energization of these relay windings depends in turn upon the bias voltage applied to grids 97 and 98 of vacuum tubes 96 and 95. When the voltage between control terminals 13 and 14 is too low, vacuum tubes 96 and 95 will both be conductive, so that relay windings 100 and 102 are each energized. Under this condition, relay contacts 85 will be open and relay contacts 86 will be closed, so that motor 84 rotates in a direction which tends to raise the output voltage between terminals 12. As the voltage between control terminals 13 and 14 increases, vacuum tube 95 cuts off, thus de-energizing relay winding 102 and causing relay contacts 86 to open. This causes motor 84 to stop rotating. As the voltage between terminals 13 and 14 becomes too high, both of vacuum tubes 95 and 96 are cut off, so that relay contacts 86 remain open and relay contacts 85 become closed. This causes motor 84 to rotate in the opposite direction, thus reducing the output voltage between terminals 12, until the normal condition of tube 96 conductive and tube 95 non-conductive is reached.

Variable resistor 88 may be adjusted to vary the range of input control voltages between the cutoff of vacuum tubes 95 and 96. The bias of both tubes may be adjusted by variable resistor 89 to a desired value. The values of resistors 87, 88 and 89 are chosen sufficiently high to limit the grid current flow of vacuum tubes 95 and 96 to a suitable maximum value.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A regulated power supply for furnishing a regulated direct output potential to a load from an alternating-current source, comprising rectifier and filter means having input and output terminals, voltage-controlling means connected between said alternating-current source and said input terminals for controlling the amplitude of alternating voltage supplied to said rectifier, a variable impedance device connected in series between said output terminals and said load, means for varying the resistance of said impedance device, said voltage-controlling means having regulating means therefor which control as a function of the voltage across said impedance device.

2. A regulated power supply for furnishing a regulated direct output potential to a load from an alternating-current source, comprising rectifier and filter means having input and output terminals, an adjustable transformer connected between said alternating-current source and said input terminals, a variable impedance device connected in series between said output terminals and said load, means for varying the resistance of said impedance device as a function of the voltage across said load, and means for regulating said transformer as a function of the voltage across said impedance device.

3. A regulated power supply for furnishing a regulated direct output potential to a load from an alternating-current source, comprising rectifier and filter means having input and output terminals, voltage-controlling means connected between said alternating-current source and said input terminals for controlling the amplitude of alternating voltage supplied to said rectifier, a variable impedance device connected in series between said output terminals and said load, means responsive to the voltage across said load for varying the resistance of said impedance device, and means for regulating said voltage-controlling means as a function of the voltage across said impedance device.

4. A regulated power supply for furnishing a regulated direct output potential to a load from an alternating-current source, comprising rectifier and filter means having input and output terminals, voltage-controlling means connected between said alternating-current source and said input terminals, a variable impedance device connected in series between said output terminals and said load, an auxiliary source of substantially constant direct potential, means energized by said auxiliary source for varying the resistance of said impedance device as a function of the voltage across said load, and means for regulating said voltage-controlling means as a function of the voltage across said impedance device.

5. A regulated power supply for furnishing a regulated direct output potential to a load from an alternating-current source, comprising rectifier and filter means having input and output terminals, voltage-controlling means connected between said alternating-current source and said input terminals, a variable impedance device connected in series between said output terminals and said load, an auxiliary source of substantially constant direct potential comprising a regulated power supply energized by said alternating-current source, means energized by said auxiliary source for varying the resistance of said impedance device as a function of the voltage across said load, and means for regulating said voltage-controlling means as a function of the voltage across said impedance device.

6. A regulated power supply for furnishing a regulated direct output potential to a load from an alternating-current source, comprising rectifier means having input and output terminals, slow-acting voltage-controlling means connected between said alternating-current source and said input terminals for controlling the amplitude of alternating voltage supplied to said rectifier, and fast-acting voltage-controlling means connected between said output terminals and said load, said fast-acting voltage-controlling means being responsive to the voltage across said load and said slow-acting voltage-controlling means being responsive to the voltage across said fast-acting voltage-controlling means.

7. A voltage-regulated power supply comprising a rectifier for receiving alternating-current input power and delivering direct-current output power, substantially non-dissipative means for varying the alternating-current input voltage supplied to said rectifier, dissipative means coupled to the output circuit of said rectifier for producing substantially direct voltage drop, and means responsive to variation of output voltage of said rectifier for regulating said non-dissipative means and said dissipative means to vary said direct voltage drop directly and the alternating input voltage inversely in accordance with changes in the rectifier output voltage.

8. A voltage-regulated power supply comprising a rectifier and a filter for receiving alternating input voltage and delivering direct output voltage, dual regulators including a substantially non-dissipative regulator device for controlling the input voltage to said filter and a dissipative regulator device for making high-speed corrections in the voltage delivered from said filter to a load, and means controlling said non-dissipative regulator device and said dissipative regulator device in accordance with variations of filter output voltage for efficiently suppressing filter output voltage variations and for substantially suppressing load voltage changes without any delay due to said filter.

9. A voltage-regulated power supply comprising a controllable source of direct voltage, output terminals having a load connected thereto, a variable resistance device connected in series between said source and said output terminals, means for controlling the resistance of said resistance device as a function of the voltage across the load connected to said output terminals, and means for controlling said source as a function of the voltage across said resistance device.

10. A voltage-regulated power supply comprising a controllable source of direct voltage, output terminals having a load connected thereto, a variable resistance device connected in series between said source and said output terminals, means for controlling the voltage across the load connected to said output terminals by said resistance device, and means responsive to said resistance device for controlling the output voltage of said source.

11. A regulated power supply for receiving power from an alternating-current source and for delivering rectified power to a direct-current load, comprising rectifying means having a direct-current output circuit for delivering direct current power to said load, variable-transformer means for coupling said rectifier means to said alternating current source, variable-resistance means connected to said output circuit for dissipating part of the output power from said rectifier means, means responsive to variations of the voltage supplied to said load for varying the resistance of said variable-resistance means in the manner to suppress said load voltage variations, and means coupled to said variable-resistance means and operatively coupled to said variable-transformer means for decreasing the alternating voltage supplied to said rectifier means as the voltage across said variable-resistance means increases and for increasing the alternating voltages supplied to said rectifier means as the voltage across said variable-resistance means decreases.

12. A regulated power supply for furnishing a regulated unidirectional voltage output to a load from an alternating-current source, comprising a rectifier means having input and output terminals, voltage-controlling means connected between said alternating-current source and said input terminals, a variable impedance connected in circuit with said rectifier output and the output terminals, means responsive to the voltage across said output terminals for varying the impedance of said variable impedance, and means responsive to the voltage across said variable impedance for controlling said voltage-controlling means.

13. A regulated power supply for furnishing a regulated unidirectional voltage output to a load from an alternating current source, comprising a rectifier means having input and output terminals and means for controlling the voltage output of said rectifier means, a variable impedance connected in circuit with said rectifier output and the output terminals, means responsive to the voltage across said output terminals for varying the impedance of said variable impedance, and means responsive to the voltage across said variable impedance for controlling said voltage-controlling means.

OLIVER HOAG.

REFERENCES CITED

The following references are of record in the file of this patent:

UNITED STATES PATENTS

| Number | Name | Date |
|---|---|---|
| 1,691,909 | Crouse et al. | Nov. 13, 1928 |
| 1,691,910 | Crouse et al. | Nov. 13, 1928 |
| 1,849,518 | Gay | Mar. 15, 1932 |
| 2,299,942 | Trevor | Oct. 27, 1942 |
| 2,337,911 | Mayer et al. | Dec. 28, 1943 |
| 2,377,500 | Johnson | June 5, 1945 |
| 2,413,033 | Potter | Dec. 24, 1946 |

FOREIGN PATENTS

| Number | Country | Date |
|---|---|---|
| 446,294 | Great Britain | Apr. 28, 1936 |
| 549,614 | Great Britain | Nov. 30, 1942 |